United States Patent
Allen

(10) Patent No.: US 8,387,954 B2
(45) Date of Patent: Mar. 5, 2013

(54) SYSTEM FOR THE SIMULTANEOUS INTRODUCTION OF TWO ITEMS INTO A CONDUIT

(75) Inventor: Jerry L. Allen, Westfield Center, OH (US)

(73) Assignee: WESCO Distribution, Inc., Pittsburgh, PA (US)

( * ) Notice: Subject to any disclaimer, the term of this patent is extended or adjusted under 35 U.S.C. 154(b) by 937 days.

(21) Appl. No.: 11/897,101

(22) Filed: Aug. 30, 2007

(65) Prior Publication Data

US 2009/0057628 A1 Mar. 5, 2009

(51) Int. Cl.
| | |
|---|---|
| B63B 35/03 | (2006.01) |
| B66F 3/00 | (2006.01) |
| B65H 59/00 | (2006.01) |
| E21C 29/00 | (2006.01) |
| H02G 1/08 | (2006.01) |
| H01R 43/00 | (2006.01) |
| H05K 13/00 | (2006.01) |
| G02B 6/44 | (2006.01) |

(52) U.S. Cl. ............ 254/134; 254/134.4; 254/134.3 R; 29/854; 385/100

(58) Field of Classification Search ............... 254/134, 254/134.4, 134.3 F, 134.3 R; 29/854, 468, 29/401.1, 819, 700, 868; 385/100, 136

See application file for complete search history.

(56) References Cited

U.S. PATENT DOCUMENTS

| | | | | |
|---|---|---|---|---|
| 252,956 | A | * | 1/1882 | Loane .................. 254/134.4 |
| 423,134 | A | * | 3/1890 | Cope .................... 254/134.4 |
| 3,119,599 | A | * | 1/1964 | Tattle ................... 254/134.4 |
| D202,107 | S | * | 8/1965 | Moldt ..................... D13/156 |
| 3,547,406 | A | * | 12/1970 | Fowler et al. ........... 254/134.4 |
| 4,202,531 | A | * | 5/1980 | Hamrick ................ 254/134.4 |
| 4,225,172 | A | * | 9/1980 | Marquardt .................. 294/74 |
| 4,367,769 | A | * | 1/1983 | Bain ........................ 138/114 |
| 4,404,457 | A | * | 9/1983 | Rokujio et al. .......... 219/137.2 |
| 4,411,409 | A | * | 10/1983 | Smith ............... 254/134.3 FT |

(Continued)

FOREIGN PATENT DOCUMENTS

| | | |
|---|---|---|
| DE | 92 06 027 | 8/1992 |
| DE | 195 24 917 | 1/1997 |

(Continued)

OTHER PUBLICATIONS

European Search Report dated Nov. 12, 2008 (5 pages).

(Continued)

*Primary Examiner* — Lee D Wilson
*Assistant Examiner* — Alvin Grant
(74) *Attorney, Agent, or Firm* — Renner, Kenner, Greive, Bobak, Taylor & Weber

(57) ABSTRACT

A system (10) for simultaneously introducing a cable (11) and another item (21) into a conduit (12) includes a pushing machine (13) and an air blower (15) which introduces the cable (11) into the conduit (12). The conduit (12) is split near the pushing machine (13) so that the item (21) may be attached to the cable (11) by means of an attachment device (25) carried by a bullet head (23) at the leading end of the cable (11). A block (18) then connects the split ends (16, 17) of the conduit (12), and the cable (11) and other item (21) may then be moved together through the conduit (12) by the pushing machine (13) and air blower (15).

11 Claims, 1 Drawing Sheet

U.S. PATENT DOCUMENTS

| | | | | |
|---|---|---|---|---|
| 4,602,763 A * | 7/1986 | Gaylin | | 254/134.3 FT |
| 4,684,161 A * | 8/1987 | Egner et al. | | 294/219 |
| 4,684,211 A * | 8/1987 | Weber et al. | | 385/136 |
| 4,750,570 A * | 6/1988 | Barrett | | 175/4 |
| 4,773,628 A * | 9/1988 | Aleshire | | 254/134.4 |
| 4,783,054 A * | 11/1988 | Morel et al. | | 254/134.4 |
| 4,850,569 A * | 7/1989 | Griffioen et al. | | 254/134.4 |
| 4,856,600 A * | 8/1989 | Baker et al. | | 175/26 |
| 4,934,662 A | 6/1990 | Griffioen et al. | | 254/134.4 |
| 5,022,634 A * | 6/1991 | Keeble | | 254/134.4 |
| 5,027,864 A * | 7/1991 | Conti et al. | | 138/177 |
| 5,074,527 A * | 12/1991 | Kumpf | | 254/134.3 FT |
| 5,197,715 A | 3/1993 | Griffioen | | 254/134.4 |
| 5,374,034 A * | 12/1994 | Flores et al. | | 254/134.4 |
| 5,472,017 A * | 12/1995 | Kovalcheck | | 138/103 |
| 5,533,834 A * | 7/1996 | Recalde | | 405/168.3 |
| 5,549,542 A * | 8/1996 | Kovalcheck | | 600/146 |
| 5,587,115 A * | 12/1996 | Allen | | 264/1.24 |
| 5,645,267 A * | 7/1997 | Reeve et al. | | 254/134.4 |
| D386,052 S * | 11/1997 | Nasir | | D8/14 |
| 5,687,954 A * | 11/1997 | Schroeder | | 254/134.3 FT |
| 5,884,384 A * | 3/1999 | Griffioen | | 29/468 |
| 5,897,103 A * | 4/1999 | Griffioen et al. | | 254/134.4 |
| 5,922,995 A * | 7/1999 | Allen | | 174/95 |
| 5,967,495 A * | 10/1999 | Kaminski et al. | | 254/134.4 |
| 6,012,621 A * | 1/2000 | Hoium et al. | | 226/35 |
| 6,019,351 A * | 2/2000 | Allen | | 254/134.4 |
| 6,170,804 B1 * | 1/2001 | Allen | | 254/134.4 |
| 6,193,217 B1 * | 2/2001 | Zimmer | | 254/134.3 FT |
| 6,561,488 B1 * | 5/2003 | Walker | | 254/134.4 |
| 6,619,697 B2 * | 9/2003 | Griffioen et al. | | 285/126.1 |
| 6,681,795 B2 * | 1/2004 | Beals et al. | | 137/318 |
| 6,796,547 B1 * | 9/2004 | Washburn | | 254/134.3 FT |
| 6,880,219 B2 * | 4/2005 | Griffioen et al. | | 29/401.1 |
| 6,947,647 B2 * | 9/2005 | Beals et al. | | 385/100 |
| 6,974,169 B1 * | 12/2005 | Upton | | 294/86.42 |
| 6,991,220 B2 * | 1/2006 | Rivers et al. | | 254/134.3 FT |
| 7,046,898 B2 * | 5/2006 | McLarty, III | | 385/134 |
| 7,078,615 B2 * | 7/2006 | Gladfelter et al. | | 174/36 |
| 7,100,274 B2 * | 9/2006 | Sylvia et al. | | 29/819 |
| 7,216,846 B2 * | 5/2007 | Crawford | | 254/134.3 FT |
| 7,621,505 B2 * | 11/2009 | Hamrick | | 254/134.3 FT |
| 7,740,230 B2 * | 6/2010 | Oberli et al. | | 254/134.4 |
| 7,870,666 B2 * | 1/2011 | McSweyn | | 29/854 |
| 2002/0083976 A1 * | 7/2002 | Beals et al. | | 137/317 |
| 2002/0189671 A1 * | 12/2002 | Beals et al. | | 137/317 |
| 2004/0025330 A1 * | 2/2004 | Sylvia et al. | | 29/700 |
| 2004/0247264 A1 * | 12/2004 | Beals et al. | | 385/100 |
| 2005/0067608 A1 * | 3/2005 | Griffioen et al. | | 254/134.4 |
| 2005/0242331 A1 * | 11/2005 | Ames et al. | | 254/134.3 FT |
| 2006/0054874 A1 * | 3/2006 | Oberli et al. | | 254/134.4 |
| 2006/0147163 A1 * | 7/2006 | Mayhew et al. | | 385/100 |
| 2008/0127437 A1 * | 6/2008 | Good | | 15/104.09 |
| 2009/0056122 A1 * | 3/2009 | Allen | | 29/868 |
| 2009/0057628 A1 * | 3/2009 | Allen | | 254/134.3 R |

FOREIGN PATENT DOCUMENTS

EP  1 339 146  8/2003

OTHER PUBLICATIONS

Mulegun (website 2 pages; NEPTCO Inc., Pawtucket, RI.
Vikimatic Cable Blowing Equipment (1995; 4 pages; Vikimatic Sales, Wadsworth, OH).
Duct Rodders (website 1 page; Condux International, Inc., Mankato, MN).
Condux Fiber Optic Cable Blower (1997; 6 pages; Condux International, Inc., Mankato, MN).
U.S. Appl. No. 12/214,093 Office Action (Mail Date Jan. 4, 2011—7 pages).

* cited by examiner

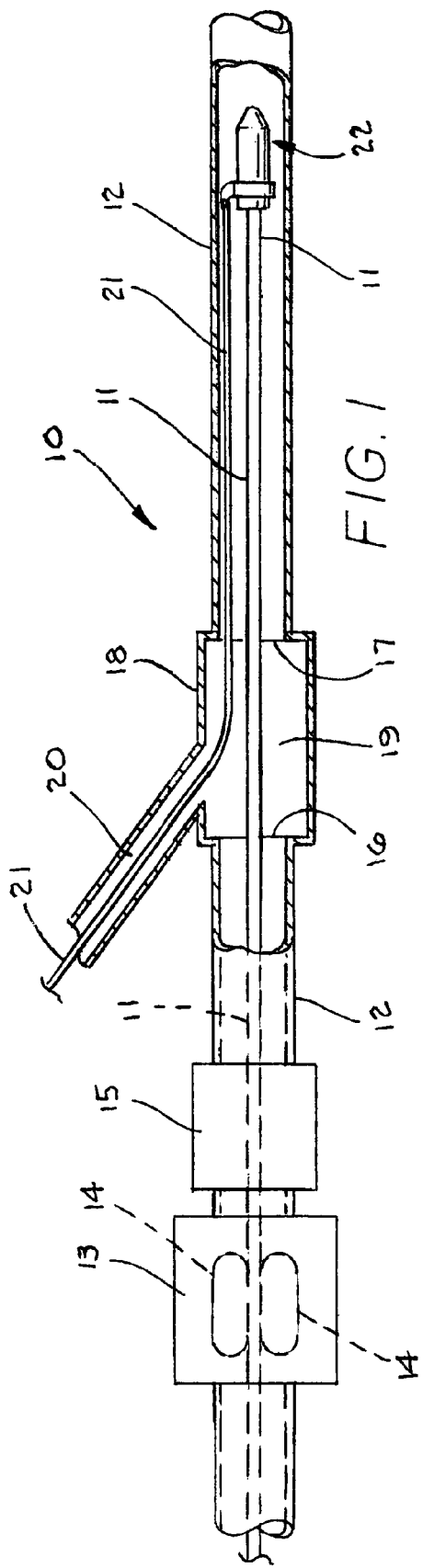
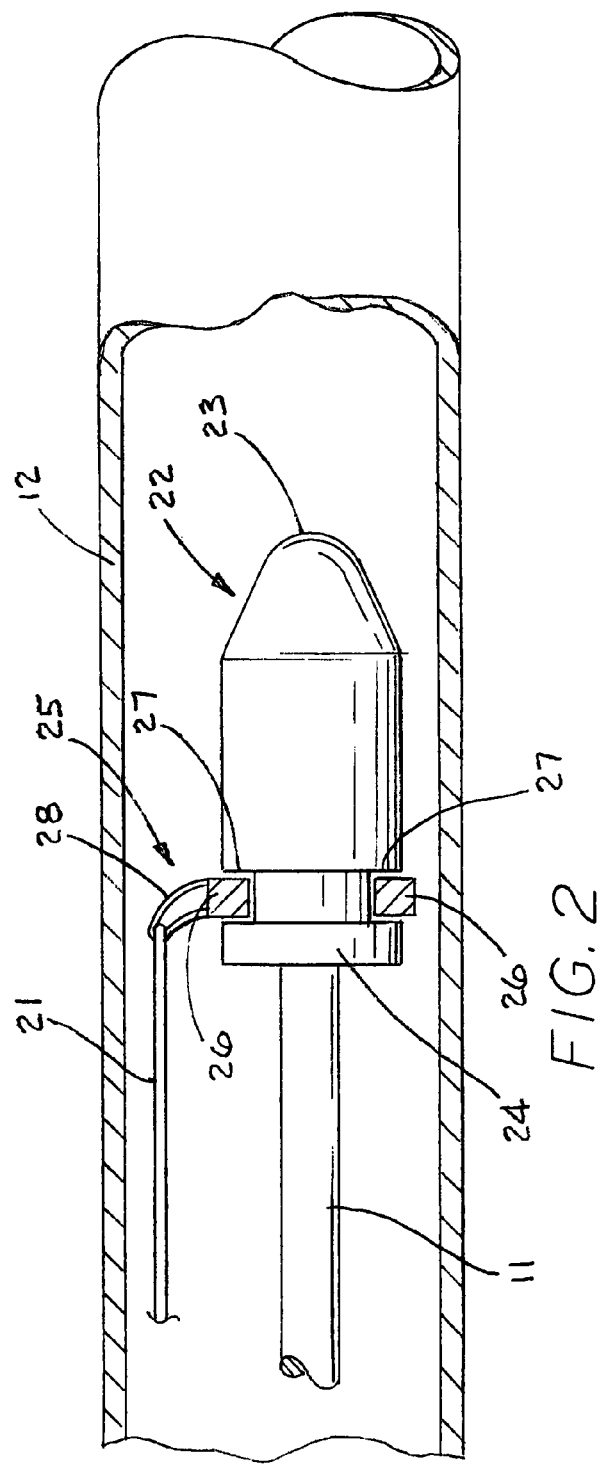

SYSTEM FOR THE SIMULTANEOUS INTRODUCTION OF TWO ITEMS INTO A CONDUIT

TECHNICAL FIELD

This invention relates to the introduction of items, such as cables, pull tapes, innerducts or the like, into an underground conduit. More particularly, this invention relates to a system wherein at least two such items can be introduced simultaneously.

BACKGROUND ART

The efficient introduction of cables into an underground conduit, which may extend for several thousand feet, has long been a problem. Such conduits are often designed to hold a plurality of cables such as for use in the telecommunications industry. The placing of the first cable in the conduit is the least problematic. Traditionally, the cable is inserted by means of a pushing device, and the insertion is assisted by a flow of air which is blown into the conduit.

Because the first cable will generally undulate within the conduit, a second cable cannot be readily positioned in the conduit by the same pushing/air blowing procedure. Rather, a pulling mechanism, usually in the form of a tape, must be positioned in the conduit. Then the second cable is attached to the pull tape which is then used to attempt to pull the second cable into the conduit.

While the pull tape is easier to insert, because of its flexibility compared to a cable, such still represents a somewhat complex procedure. In some instances where the first cable in the conduit is relatively straight, with only minimal undulations, it may be possible to use the air blowing process to insert the tape. In more impeded situations, such as a duct with a plurality of cables already in it or a duct with one undulating cable in it, a rodder system must be utilized. In this system, a relatively rigid rod is inserted and finds its way through the cable(s) to the other end of the conduit. Then the pull tape is attached to the rod and the rod is pulled back.

These systems are quite expensive to employ as they require multiple labor intensive, time consuming passes through the conduit using the expensive equipment, and even then these systems are normally only effective over short distances. The need exists, therefore, for a viable alternative to the existing systems.

DISCLOSURE OF THE INVENTION

It is thus an object of the present invention to provide a system which more efficiently permits the installation of more than one item into a conduit.

It is another object of the present invention to provide a system, as above, where at least two items are simultaneously introduced into the conduit.

These and other objects of the present invention, as well as the advantages thereof over existing prior art forms, which will become apparent from the description to follow, are accomplished by the improvements hereinafter described and claimed.

In general, a method of simultaneously introducing a cable and another item into an elongate conduit includes the steps of introducing a cable into one end of the conduit, introducing the item into the conduit downstream of the one end of the conduit, attaching the item to the cable, and moving the cable and the item through the conduit.

A system for simultaneously inserting a cable and another item into an elongate conduit having a split therein includes pushing means to introduce a cable into one end of the conduit and push the cable toward the split in the conduit. A block connects the split in the conduit, the block including means to introduce the item into the conduit. Means are provided to attach the item to the cable so that the pushing means may move the cable and the item through the conduit to the other end thereof.

A preferred exemplary system for the simultaneous introduction of a cable and another item into a conduit according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a schematic representation of a system for simultaneously introducing a cable and another item into a conduit.

FIG. 2 is an enlarged schematic view showing the manner in which the item is connected to the cable.

PREFERRED EMBODIMENT FOR CARRYING OUT THE INVENTION

The subject invention relates to a system, generally indicated by the numeral 10, for the simultaneous introduction of a cable 11 or similar item into a conduit 12 of the type that may extend for several thousand feet underground. A supply of cable 11 may be provided in a roll (not shown) to a conventional cable pushing machine 13 shown schematically in FIG. 1. Such machines 13 typically include opposed tractor-like devices 14 which grip cable 11 and push it through conduit 12. This pushing force may be assisted by a conventional air blower 15. The pushing machine 13 and air blower 15 equipment are of the type which can be purchased from Sherman & Reilly, Inc. of Chattanooga, Tenn.

The conduit is split or spliced, somewhat downstream of, but near machine 13 and blower 15, to provide opposed split ends 16 and 17. A split, openable, coupling block 18 joins ends 16 and 17 with a space 19 therebetween. Block 18 can be generally of the type shown in U.S. Pat. No. 6,019,351 to which reference is made, as necessary, for a complete understanding thereof. While block 18 is shown as a separate item, one skilled in the art would appreciate that air blower 15 and block 18 could be commercially provided as one unit without departing from the concept of the present invention. Whether provided with blower 15 or as a separate unit, block 18 is shown as including a passageway 20 through which an item 21 may be introduced. Item 21 may be any type of item that may be desired to be inserted into conduit 12 such as a pull tape, an innerduct sleeve, such as shown in U.S. Pat. No. 6,262,371, or even another cable.

A bullet head, generally indicated by the numeral 22, is shown as being attached to the leading edge of cable 11. As schematically shown in FIG. 2, bullet head 22 includes a round leading surface 23 designed to reduce the friction which might otherwise be cause by the blunt end of cable 11. The base end 24 of bullet head 22 is attached to cable 11 by any suitable means. For example, end 24 may be provided with interior threads to be received on a threaded coupling attached to cable 11. A device to attach the item 21 to bullet head 22 and thus to cable 11 is generally indicated by the numeral 25. Device 25 includes a ring 26 which can be received in a groove 27 formed in base end 24 of bullet head 22. Ring 26 can carry a loop 28 to which item 21 is attached. As such, device 25 can rotate or swivel on bullet head 22 as ring 26 is free to move in groove 27. Such motion can be helpful as head 22 moves through turns or the like in conduit 12.

In the operation of system 10, block 18 is open and the end of cable 11 having head 22 thereon is fed to the area of space 19 between spliced conduit ends 16 and 17. At that location, the end of the item 21 to be inserted with cable 11 is attached to bullet head 22, as just described. Then block 18 is closed and sealed to join the two conduit ends 16 and 17. At this point, operation of pushing machine 13 and blower 15 will move cable 11 and item 21 simultaneously through conduit 12.

In view of the foregoing, it should thus be evident that a system as described herein accomplishes the objects of the invention and otherwise substantially improves the art.

What is claimed is:

1. A method of simultaneously inserting a cable and another item into an elongate conduit comprising the steps of attaching a head to the leading end of the cable, introducing the cable into one end of the conduit, downstream of the one end introducing the item and attaching the item to the head, and blowing air past the cable and the item to move the cable and the item together through the conduit while maintaining the item spaced from the cable so that a second cable can be attached to the item and inserted into the conduit.

2. The method of claim 1 further comprising the step of splicing the conduit at the downstream location to introduce and attach the item to the head at the spliced location.

3. The method of claim 2 further comprising the step of reconnecting the spliced conduit after connecting the item to the head.

4. The method of claim 3 wherein the step of reconnecting is accomplished by a block connecting the spliced ends of the conduit with the cable and item therebetween.

5. The method of claim 1 further comprising the step of pushing the cable.

6. A system for simultaneously inserting a cable and another item into an elongate conduit having a split therein comprising pushing means to introduce a cable into one end of the conduit and push the cable toward the split in the conduit, a block connecting the split of the conduit, the block including means to introduce the item into the conduit, and means to attach the item to the leading end of the cable with the remainder of the item being separated from the cable so that the pushing means may move the cable and the item through the conduit to the other end thereof, and so that when the item is detached from the cable the item and the cable are separated.

7. The system of claim 6 further comprising blowing means to move air past the cable and the item to assist the pushing means in moving the cable and the item through the conduit.

8. The system of claim 6 wherein there is an area in said block between the split ends of the conduit, and said block includes a passageway communicating with said area, the item being received through said passageway and into the conduit.

9. The system of claim 6 further comprising a head positioned on the leading edge of said cable, said means to attach connecting the item to said head.

10. The system of claim 9 wherein said means to attach includes a ring carrying a loop, said item being attached to said loop.

11. The system of claim 10 wherein said head has a groove therein, said ring being received in said groove so that said loop can rotate around said head.

\* \* \* \* \*